Jan. 7, 1969     D. M. WALTERS     3,420,537
WORKHOLDER AND EXPANSIBLE COLLET THEREFOR
Filed Oct. 22, 1965
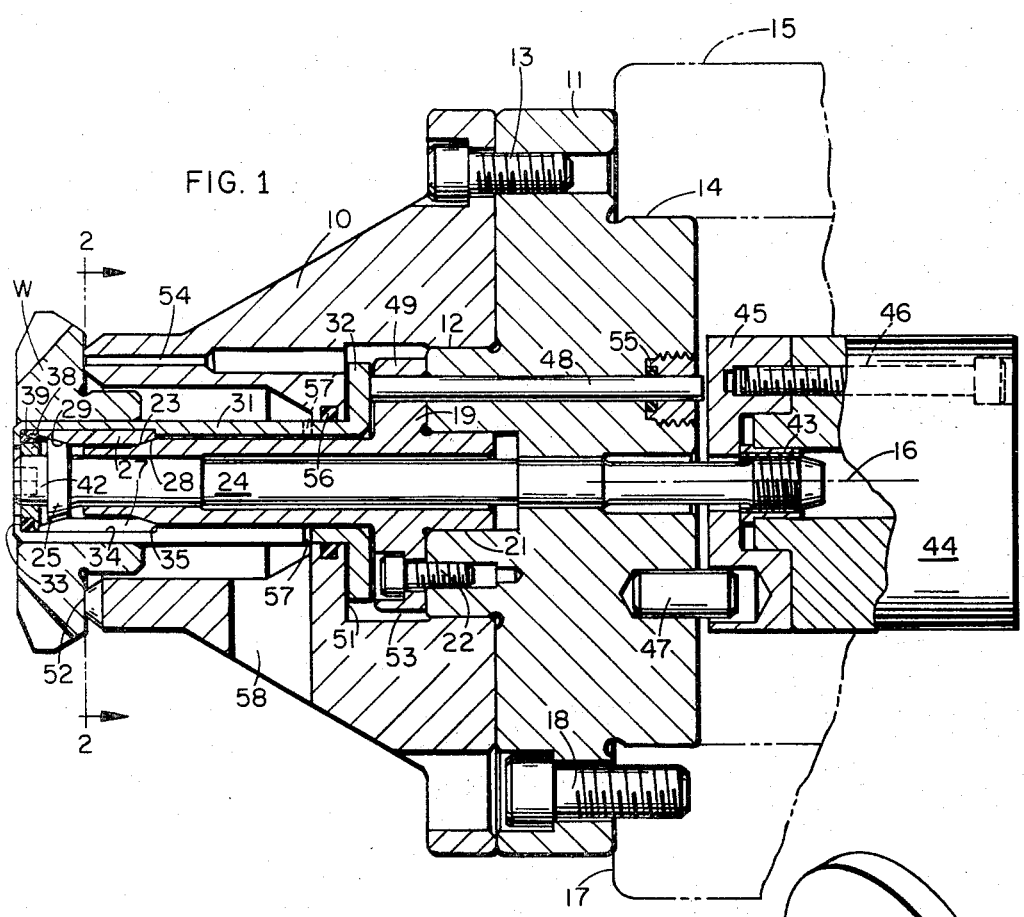
INVENTOR.
DEREK M. WALTERS
BY *Richard W. Treverton*
ATTORNEY United States Patent Office 3,420,537
Patented Jan. 7, 1969

3,420,537
WORKHOLDER AND EXPANSIBLE COLLET THEREFOR
Derek M. Walters, Rochester, N.Y., assignor to The Gleason Works, Rochester, N.Y., a corporation of New York
Filed Oct. 22, 1965, Ser. No. 500,770
U.S. Cl. 279—2           6 Claims
Int. Cl. B23b 31/12

ABSTRACT OF THE DISCLOSURE

A workholder having a radially expansible tubular collet which enters into and grips the bore of a work gear. The collet extends around a stationary conical expander and an axially movable conical expander. When the latter is moved toward the stationary expander they act with radially expanding action against mating internal conical surfaces of the collet. The collet has a number of slits extending axially from the end which enters the bore of the gear, these slits all terminating short of the opposite end of the collet and being substantially longer than the portion of the collet between the two expanders. The slitted end of the collet thus consists of a number of slender and relatively flexible fingers.

---

The present invention relates to a workholder for chucking gears and like workpieces and to an improved collet included therein.

A conventional collet for this purpose is of tubular form and has thereabout a number of longitudinal slits of which alternate ones open to the opposite ends of the collet, rendering it expansible to grip the bore of a workpiece. The interior of the collet at both ends is tapered to provide internal conical surfaces which are engaged by external conical surfaces that are provided respectively on the body of the workholder and on an axially movable actuator, the arrangement being such that when the actuator is moved to draw the external conical surfaces together, they act against the internal conical surfaces to expand the collet in the workpiece bore.

Among the limitations of such a collet is the fact that when its inter-slit portions are made thick and rigid enough to firmly clamp the workpiece bore throughout its length, the collet has little radial elasticity. Thus, upon only a slight reduction of its diameter by wear, the collet can no longer be expanded sufficiently to grip workpieces without undue hazard of breakage; even when new, the collet can tolerate only very slightly oversize workpiece bores; and, an especially serious matter when workpieces are loaded by a mechanical device, rather than manually, the workpieces must be brought into very accurate alignment with the collet before they can be placed on it.

The object of the present invention is a collet, and a workholder incorporating it, having much greater radial elasticity, to thereby provide greater life, greater tolerance to oversize workpiece bores, and greater tolerance in the alignment of a workpiece with the workholder while it is being placed on the latter.

According to the invention the collet is of generally tubular form having oppositely tapering internal surfaces for engagement by substantially complementary external expander surfaces upon relative axial motion of the latter, said collet having slits extending axially from one end thereof and terminating short of the opposite end thereof, one of the internal surfaces being adjacent said one end of the collet and the other one of the internal surfaces being intermediate said one end and the inner ends of said slits, the portions of the collet between said other one of the internal surfaces and the inner ends of the slits being of smaller cross-section than the parts of the collet between said oppositely tapering internal surfaces, said portions constituting flexible fingers which carry said parts for bodily displacement in radial planes.

A preferred embodiment of the invention, designed for mounting workpieces in the form of bevel gears on the work spindle of a gear cutting machine, is shown in the accompanying drawings, wherein:

FIG. 1 is an axial section through the workholder and a workpiece approximately in the planes designated 1—1 in FIG. 2;

FIG. 2 is a cross-section through the workholder in plane 2—2 of FIG. 1; and,

FIG. 3 is an isometric view of the collet itself.

The illustrated workholder has a body comprising front and rear sections 10 and 11 which are centered by hub 12 and are rigidly connected by a plurality of screws 13 arranged in a circle around the hub. A slightly tapered nose 14 is provided on section 11 for centering engagement in the similarly tapered bore of the machine work spindle 15 whose rotation axis is designated 16. The workholder body is secured against the front end face 17 of the spindle by several circularly arranged screws 18.

A third section of the workholder body, arbor 19, is centered in section 11 by hub 21 and is rigidly secured thereto by several circularly arranged screws 22. Near its front the arbor has a forwardly facing external conical expander surface 23. Slidable axially in the arbor is an actuator rod 24 having, forwardly of the arbor, a rearwardly facing external conical expander surface 25.

Extending around the forward portion of the arbor 19 is expansible collet 26. It comprises a plurality of separate segments 27, six in the illustrated embodiment, which together constitute a tubular structure completely separated into segments by axial interstices or slits 30. The end portions of this separated tubular structure are tapered to provide a conical surface 28 complementary to expander surface 23 and a conical surface 29 complementary to expander surface 25. The collet 26 further comprises a tubular member 31 having at its rear an external peripheral flange 32 and at its front a smaller internal peripheral flange 33. The internal surface 34 near the front of member 31 is recessed and is complementary to and in contact with the outer surfaces of segments 27. The recessed surface 34 lies between flange 33 and a shoulder 35 which abuts the back end faces of the segments 27.

The forward part of member 31 has axial slits 36 which are radially aligned with the slits 30 and which extend from the front of the member to within a short distance of rear flange 32, thereby providing the member with relatively long, flexible fingers 37, each of which carries one segment 27. The segments are retained against shoulder 35 by a metallic ring 38 which abuts the forward ends of the segments and a quad-ring 39 of rubber-like material disposed between flange 33 and ring 38. In assembly, rings 38, 39 are inserted from the front of the collet after fingers 37 are first spread radially. The slits 30 and 36 are filled with a rubber-like sealing material 41 (shown only in FIG. 2) which is adherent to the segments and to member 31, and acts to retain them in assembly as well as serving to exclude foreign matter from the collet interior. The forward end portion 42 of the actuator rod 24 has a close sliding fit in ring 38.

The actuator rod, which is centered and guided by the front portion of arbor 19 and body section 11, is screw-threaded to a nylon lined nut 43 clamped to a connector 44. The latter connects the actuator rod 24 to a draw rod that extends to an hydraulic actuating unit on the rear of the spindle 15. The draw rod and actuator unit are not shown. Nut 43 has a square flange held in a cross-slot in connector 44 by a cap 45 that is secured to the connector by screws 46 and is held against rotation relative to chuck body 10, 11, by a key pin 47. The arrangement is such that the actuator rod 24 will not rotate relative to the body 10, 11, except when being assembled or adjusted by means of a wrench applied to a socket in front portion 42. The plane front face of cap 45 is adapted to abut rods 48, three of which, arranged in circle around axis 16, are slidable in bores in the body. These pins are also adapted for abutment with collet flange 32, which has limited axial motion between flange 49 of arbor 19 and internal face 51 of body section 10.

The collect 26 is so proportioned that in its normal, unexpanded condition it will fit loosely in the bore of a workpiece W, in this instance a bevel gear. Preferably, the segments 27 lie completely or almost completely within the confines of the bore when the back face of the workpiece abuts seats 52 which are provided on the front of body section 10. When the workpiece is so positioned a rearward pull (to the right in FIG. 1) of actuator 24 by draw rod causes expander surfaces 25, 29 and 23, 28 to engage and expand the collet radially to tightly grip the workpiece bore and, by drawing the collet rearwardly, clamps the workpiece against seats 52. Accordingly the parts are preferably so proportioned that after the workpiece is chucked a slight space still remains between flanges 32 and 49. After the chucked workpiece has been machined, dechucking is effected by forward movement of the draw rod, causing expander surface 25 to release collet surface 29 and then to cause cap 45 to abut and move rods 48 forwardly, the rods abutting and moving the collet forwardly and thus separating conical surfaces 23 and 28. The rods 48 are of such length that the cap 45 (and expander surface 25) can move forwardly beyond the position in which flange 32 abuts surface 51, assuring the separation of surfaces 25, 29 during the dechucking operation.

Air-pressure-controlled means may be provided to assure the workpiece being properly clamped to seats 52 before cutting is begun. For this purpose, after the workpiece has been chucked, air under pressure is introduced (through passages not shown) into chamber 53 from which extend pasages 54 that open through the centers of alternate seats 52. In the event the workpiece is improperly clamped it will fail to close these openings so that air pressure will be lost, and the air-pressure-controlled means will act to prevent gear cutting operation of the machine. To prevent unwanted passage of air, and also to seal the workholder interior against the ingress of foreign matter, sealings rings 55 and 56 may when desired be provided respectively around rods 48 and also around the unslitted portion of member 31 between the drilled holes 57 at the ends of slits 36 and the flange 32. Cutting chips, oil and other matter entering the space between body section 10 and the slitted portion of member 31 can readily escape through radial openings 58, one of which appears in FIG. 1. Preferably the cutting oil supply of the machine is arranged to flush this space with oil after each work gear is removed.

Referring to FIG. 1, and considering members 27 and 31 as constituting a single unit, the work-engaging parts of the collet between surfaces 28 and 29 are relatively short, thick and rigid, adapted to grip the workpieces with great pressure without appreciable flexure, whereas the portions between surfaces 28 and the drilled holes 57 at the ends of slits 36 are relatively thin and can accommodate repeated relatively large radial displacements of the work-engaging parts without danger of breakage. The thickness of the fingers 37 between surfaces 28 and flange 32 can be varied readily to achieve the desired flexibility. Ordinarily this thickness is reduced when the workholder design requires the distance 28–32 to be reduced. Preferably the internal conical surfaces 28, 29 are finish ground with the collet expanded to accommodate a workpiece bore of the design diameter, for the purpose of obtaining as complete a bearing surface between the collet and workpiece as is possible.

Having now described the invention and the manner of its use, what I claim is:

1. A workholder having oppositely tapering external expander surfaces adapted for relative axial motion, and a collet of generally tubular form having oppositely tapering internal surfaces for engagement respectively by said external expander surfaces upon relative axial motion of the latter, said collect having slits extending axially from one end thereof and terminating short of the opposite end thereof, one of the internal surfaces being adjacent said one end of the collet and the other one of the internal surfaces being intermediate said one end and the inner ends of said slits, the portions of the collet between said other one of the internal surfaces and the inner ends of the slits being of smaller cross-section than the parts of the collet between said oppositely tapering internal surfaces, said portions constituting flexible fingers which carry said parts for bodily emplacement in radial planes.

2. A workholder according to claim 1 wherein the collet comprises a tubular member having said slits and having an internal circumferential groove providing shoulders adjacent said oppositely tapering internal surfaces, and a plurality of separate collet segments disposed in said groove, with one such segment being carried by each inter-slit portion of said member and being substantially co-extensive therewith circumferentially of the collet, said segments being located axially of said member by at least one of said shoulders, a section of each of said internal surfaces being formed on each segment.

3. A workholder according to claim 2 in which said slits and the interstices between said segments of the collet are radially aligned and are filled with a rubber-like substance adherent to said member and to said segments.

4. A workholders according to claim 1, comprising a workholder body in which the collet is axially movable, an arbor rigid with the body and extending into the collet, said arbor having as one of said external expander surfaces a surface complementary to and engageable by said other one of said internal surfaces upon motion of the collet relative to the arbor body in a direction to draw a workpiece against the chuck body, and an actuator slidable axially in the arbor and having as the other one of said external expander surfaces a surface complementary to and engageable by said one of said internal surfaces upon motion of the actuator relative to said body in said direction.

5. A workholder according to claim 4 having means for moving the collet relative to said body in the opposite direction, to dechuck the workpiece upon terminal motion of the actuator in said opposite direction.

6. A workholder according to claim 5 in which said collet has an annular flange at said opposite end thereof, and said means comprise at least one pin slidable in the body parallel to said actuator and engageable with said flange by and upon terminal movement of the actuator in said opposite direction.

References Cited

UNITED STATES PATENTS

| 2,877,022 | 3/1959 | Parker | 279—2 |
| 2,970,842 | 2/1961 | Drew | 279—2 |

FOREIGN PATENTS

| 482,766 | 5/1938 | Great Britain. |
| 927,649 | 5/1963 | Great Britain. |

ROBERT C. RIORDON, *Primary Examiner.*

D. R. MELTON, *Assistant Examiner.*